United States Patent [19]

Kudoh

[11] Patent Number: 6,008,751

[45] Date of Patent: Dec. 28, 1999

[54] RADAR APPARATUS INSTALLED ON VEHICLE FOR MANAGING REFLECTOR INFORMATION

[75] Inventor: Hiroshi Kudoh, Saitama, Japan

[73] Assignee: Honda Giken Kogyo Kabushiki Kaisha, Tokyo, Japan

[21] Appl. No.: 09/250,375

[22] Filed: Feb. 16, 1999

[30] Foreign Application Priority Data

Feb. 16, 1998 [JP] Japan .................................. 10-050143

[51] Int. Cl.⁶ .................................................. G01S 13/18
[52] U.S. Cl. ............................. 342/70; 342/74; 342/81; 342/85; 342/94
[58] Field of Search ................................. 342/70, 71, 72, 342/74, 79, 81, 85, 87, 89, 94, 95, 96

[56] References Cited

U.S. PATENT DOCUMENTS

| Re. 36,095 | 2/1999 | Urabe et al. ............................. 342/128 |
| 4,122,450 | 10/1978 | Kowalski et al. ......................... 342/91 |
| 4,357,607 | 11/1982 | Van der Heijden et al. ........... 342/197 |
| 5,369,409 | 11/1994 | Urabe et al. ............................. 342/133 |
| 5,448,244 | 9/1995 | Komatsu et al. ........................ 342/155 |
| 5,467,284 | 11/1995 | Yoshioka et al. ........................ 701/301 |
| 5,579,010 | 11/1996 | Iihoshi et al. .............................. 342/70 |
| 5,668,739 | 9/1997 | League et al. ............................ 382/103 |
| 5,933,109 | 8/1999 | Tohya et al. ............................. 342/175 |
| 5,945,939 | 8/1999 | Iihoshi ...................................... 342/70 |

FOREIGN PATENT DOCUMENTS

| 0495759 | 1/1992 | European Pat. Off. . |
| 9800728 | 1/1998 | WIPO . |

Primary Examiner—John B. Sotomayor
Attorney, Agent, or Firm—Carrier, Blackman & Associates, P.C.; Joseph P. Carrier; William D. Blackman

[57] ABSTRACT

A radar apparatus installed on a vehicle includes a transmission section, a reception section and a processing section. The transmission section includes at least a transmission antenna, and emits a transmission wave toward a detection area in front of the vehicle. The transmission wave is reflected by a reflector to produce a reflection wave, and the detection area includes a plurality of sub-areas. The reception section includes at least a reception antenna, and receives and detects the reflection wave. The processing section detects a reflector indication data indicative of a reflector attribute based on the detecting result by the reception section, and then determines whether there is the reflector in the detection area, based on the reflector indication data. Also, the processing section manages the reflector indication data over a management area which is wider than the detection area.

22 Claims, 5 Drawing Sheets

RADAR APPARATUS INSTALLED ON VEHICLE FOR MANAGING REFLECTOR INFORMATION

BACKGROUND OF THE INVENTION

1. Field of the Invention The present invention relates to a radar apparatus installed on a vehicle, and more particularly to such a radar apparatus, which detects a reflector such as a preceding vehicle and manages information indicative of the reflector.

2. Description of the Related Art

For the application in a tracking operation relative to a preceding vehicle and an alarm system for prevention of collision between vehicles, a radar apparatus installed on a vehicle has been developed. In the radar apparatus, a beam such as millimeter wave and laser wave is radiated to a reflector in such a way that a reflection wave is received back from the reflector to detect information on the reflector. For use in this radar apparatus installed on a vehicle, various radars have been developed such as an FM radar which transmits and receives a frequency modulation wave, an AM radar which transmits and receives an amplitude modulation wave, and a pulse radar.

In the radar apparatus installed on a vehicle, namely, in a vehicle radar apparatus for monitoring the front side of the vehicle, a beam having a sharp directivity is mechanically scanned to cover a predetermined angle range in the front of the vehicle. Otherwise, plural beams of the sharp directivity are transmitted in order from a plurality of antennas arranged to direct the beams at slightly different directions from each other. Thus, by performing electronic scanning of the beams, an azimuth data for the reflector and a distance to the reflector may be are obtained. In Japanese Patent No. 2567332, which is granted to the assignee of the present invention, a time divisional radar system is disclosed, in which a beam is electronically scanned. Then, a weighting and averaging operation is performed in accordance with the reception level of the reflection wave. Thus, it is possible to divide balancing processing in the line so that the azimuth angle of the reflector is detected.

As the resolutions of distance and azimuth angle are improved, a detection area or a field of view of the radar apparatus in the front of a vehicle can be divided into meshes in distance and in azimuth angle (the width) to form sub-areas of a two-dimensional structure. Thus, the reflector such as a preceding vehicle is detected over the sub-areas.

According to Japanese Laid Open Patent Application (JP-A-Heisei 5-180934), a group of continuous sub-areas in which the reflection wave is detected, is detected as a single reflector wave so that the movement of the reflector in the detected sub-areas is managed so as to detect a relative velocity between the subject vehicle on which the radar apparatus is installed and the reflector such as another vehicle or an obstacle. In the method of estimating the relative velocity between the subject vehicle and the other vehicle, the reflector such as the preceding vehicle as a detection object is managed only in the field of view of the radar apparatus installed on the subject vehicle. Therefore, a perfect data on the shape of the reflector can be obtained in a tolerance limit of the spatial resolution, when the reflector is detected in the center portion in the field of view of the radar apparatus. However, when the reflector is detected in a peripheral portion in the field of view of the radar apparatus, only an imperfect data can be obtained on the shape of the reflector due to lack of data for a portion out of this field of view. Therefore, when the reflector, which has been detected in the center portion in the field of view of the radar apparatus, is about to leave out of this field of view, the perfect data of the center position and width is once acquired and then is lost.

SUMMARY OF THE INVENTION

The present invention is accomplished to solve the above problems and limitations of the Relevant Art. Therefore, an object of the present invention is to provide a radar apparatus installed on a vehicle, in which data indicative of a reflector such as a position and a width of the reflector can be correctly detected and managed.

In order to achieve an aspect of the present invention, a radar apparatus installed on a vehicle includes a transmission section, a reception section and a processing section. The transmission section has at least a transmission antenna, and emits a transmission wave toward a detection area in a front of the vehicle. The transmission wave may be reflected by a reflector to produce reflection wave, and the detection area includes a plurality of sub-areas. The reception section has at least a reception antenna, and receives and detects the reflection wave. The processing section detects a reflector indication data indicative of a reflector attribute based on the detecting result by the reception section, and determines whether there is the reflector in the detection area, based on the reflector indication data. Also, the processing section manages the reflector indication data over a management area which is wider than the detection area.

The processing section desirably determines that there is the reflector in the detection area when a reception level of the reflection wave in at least one of the plurality of sub-areas is higher than a predetermined threshold value.

In this case, the processing section detects a width of the reflector as the reflector attribute in units of said sub-areas. Also, the processing section detects a width of the reflector as the reflector attribute based on a predetermined width value set for each of the plurality of sub-areas and a number of continuous ones of the plurality of sub-areas, in each of which the reception level of the reflection wave is higher than the predetermined threshold value.

Also, the processing section further determines a distance to the reflector based on a time of the emission of the transmission wave and a time of the reception of the reflection wave, and each of the plurality of sub-areas has a fan shape with an opening angle. Thus, the processing section calculates a sub-area width value based on the opening angle and the distance to the reflector, and determines the width of the reflector based on the calculated sub-area width value and a number of continuous ones of the plurality of sub-areas, in each of which the reception level of the reflection wave is higher than the predetermined threshold value.

The processing section may detect a center position of the reflector as the reflector attribute based on continuous ones of the plurality of sub-areas, in each of which the reception level of the reflection wave is higher than the predetermined threshold value.

The processing section may detect a center position of the reflector as the reflector attribute based on the reflection wave reception levels higher than the predetermined threshold value in continuous ones of the plurality of sub-areas and an azimuth angle in each of the continuous sub-areas.

When the reflection wave reception levels higher than the predetermined threshold value increase monotonously in the continuous sub-areas, the processing section supplements in the management area, at least an imaginary reflection wave reception level corresponding to the reflection wave reception levels. Also, the processing section may detect a center position of the reflector as the reflector attribute based on the reflection wave reception levels higher than the predetermined threshold value, including the imaginary reflection wave reception level, and an azimuth angle in each of the continuous sub-areas.

The processing section may detect a center position of the reflector as the reflector attribute based on higher ones of the reflection wave reception levels higher than the predetermined threshold value in continuous ones of the plurality of sub-areas and an azimuth angle in each of ones of continuous sub-areas having the higher reflection wave reception levels.

The processing section may continue the management of the reflector indication data when it is determined that the reflector is not in the detection area and when it is determined that the reflector is in a peripheral area of the management area outside the detection area.

The processing section may continue the management of the reflector indication data when it is determined that the reflector is not in the detection area and when it is again determined within a predetermined time that the reflector is in the detection area.

The processing section may stop the management of the reflector indication data when it is determined that the reflector is not in the detection area and when a predetermined time elapses.

The management area includes the detection area and peripheral areas provided on both sides of the detection areas, and a width of the peripheral area may be predetermined.

Also, the management area includes the detection area and peripheral areas provided on both sides of the detection areas, and a width of the peripheral area may be automatically set based on a width of the reflector.

In order to achieve another aspect of the present invention, a method of managing a reflector indication data in a radar apparatus installed on a vehicle includes the steps of:

emitting a transmission wave toward a detection area in front of the vehicle, wherein the transmission wave may be reflected by a reflector to produce reflection wave, and the detection area includes a plurality of sub-areas;

receiving and detecting the reflection wave;

detecting a reflector indication data indicative of a reflector attribute based on the detecting result of the receiving and detecting step;

determining whether there is the reflector in the detection area, based on the reflector indication data; and managing the reflector indication data over a management area which is wider than the detection area.

The detecting step includes detecting that there is the reflector in the detection area based on a reception level of the reflection wave in at least one of the plurality of said sub-areas which is higher than a predetermined threshold value. The detecting step also includes detecting a width of the reflector as the reflector attribute in units of said sub-areas.

The method may further include continuing the management of the reflector indication data when it is determined that the reflector is not in the detection area and when it is determined that the reflector is in a peripheral area of the management area outside the detection area. The continuing step includes continuing the management of the reflector indication data when it is determined that the reflector is not in the detection area and when it is again determined within a predetermined time that the reflector is in the detection area.

The method may further include the step of stopping the management of the reflector indication data when it is determined that a predetermined time elapses during which the reflector is not in the detection area.

The management area includes the detection area and peripheral areas provided on both sides of the detection areas, and a width of the peripheral area is predetermined. Alternatively, the management area includes the detection area and peripheral areas provided on both sides of the detection areas, and a width of the peripheral area is automatically set based on a width of the reflector.

DETAILED DESCRIPTION OF THE PRESENTLY PREFERRED EMBODIMENTS

The radar apparatus of the present invention will be described below in detail with reference to the attached drawings.

Figure 1:
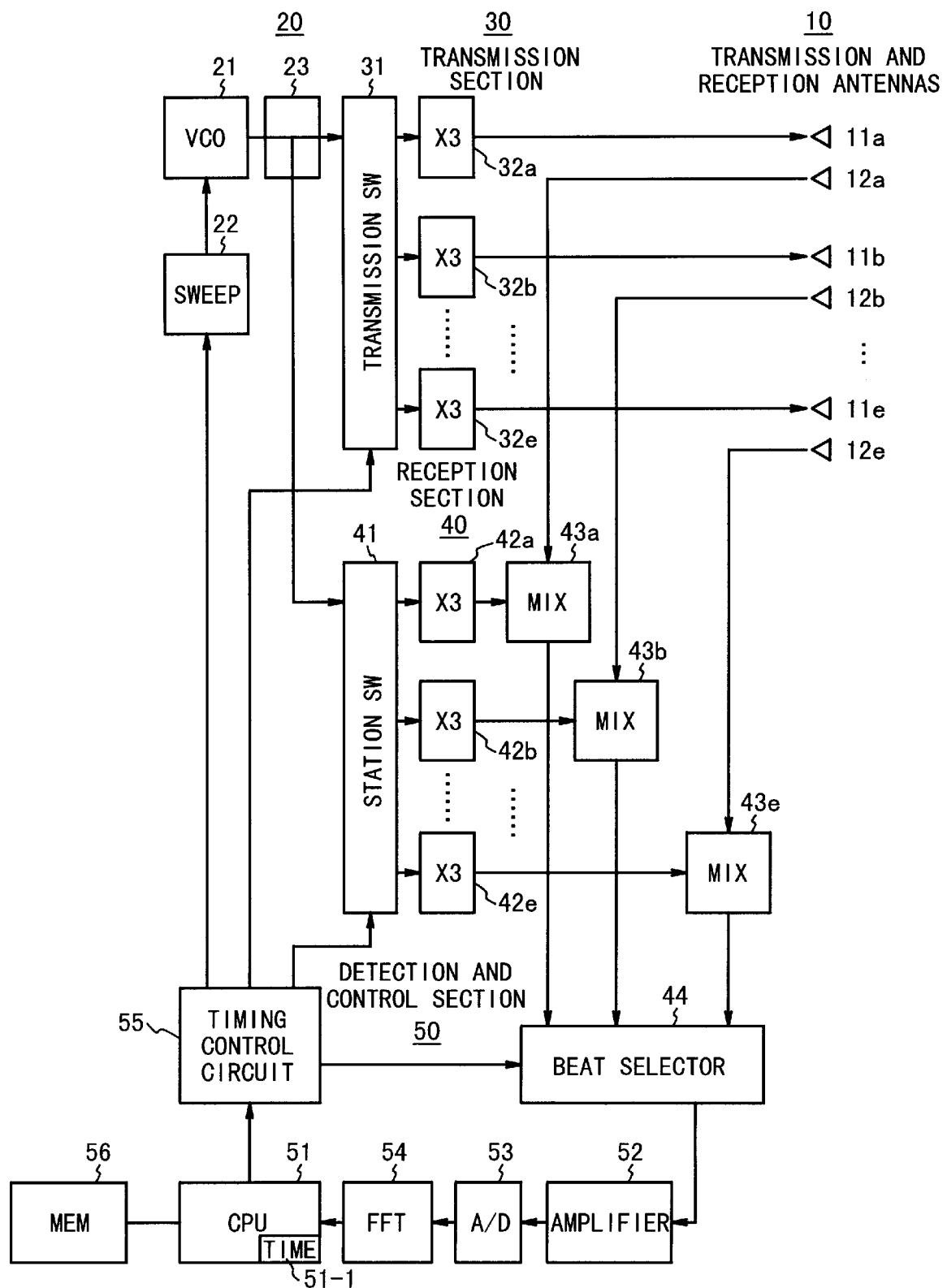
FIG. 1 is a block diagram illustrating the structure of a radar apparatus installed on a vehicle according to a preferred embodiment of the present invention.

FIG. 1 is a block diagram illustrating the structure of a radar apparatus installed on a vehicle according to a preferred embodiment of the present invention. The radar apparatus is composed of a transmission and reception antenna section 10, an FM signal generating circuit 20, a transmission section 30, a reception section 40, and a detection and control section 50.

The transmission and reception antenna section 10 is composed of transmission antennas 11a to 11e and reception antennas 12a to 12e. The antennas are grouped in five sets of one transmission antenna and one reception antenna, the sets are corresponding to transmission and reception channels A to E, respectively. The transmission antennas and the reception antennas are preferably formed as a defocus parabolic multi-beam antenna composed of a common parabolic reflecting mirror and a plane array antenna as a primary emitter which is arranged to be opposite to the reflecting mirror in the neighborhood of the focus of this reflecting mirror. The respective transmission antennas 11a to 11e are installed to radiate beams in slightly different directions from each other in azimuth. The reflection waves which are generated from the beams which have been radiated from the respective transmission antennas are received by the reception antennas 12a to 12e.

The FM signal generating section 20 is composed of a voltage controlled oscillator (VCO) 21, a sweep circuit 22, and a voltage dividing circuit 23. The sweep circuit 22 supplies a triangular modulation voltage to the voltage controlled oscillator 21 in response to a control signal from the detection and control section 50. The voltage controlled oscillator (VCO) 21 generates a high frequency signal in a submillimeter wave band based on the triangular modulation voltage supplied from the sweep circuit 22. The voltage dividing circuit 23 divides the high frequency signal into two components to supply to the transmission section 30 and the reception section 40.

The transmission section 30 is composed of a transmission switching circuit 31 and frequency triple increasing circuits 32a to 32e. The transmission switching circuit 31 sequentially supplies the divided component of the high frequency signal to the frequency triple increasing circuits 32a to 32e in response to a timing control signal supplied from the detection and control section 50. Each of the frequency triple increasing circuits 32a to 32e increases the frequency of the divided component of the high frequency signal to 3 times its original value such that a beam is radiated from the corresponding one of the transmission antennas 11a to 11e.

Each of the reception antennas 12a to 12ereceives a reflection wave to generate a reflection FM signal. The reception section 40 is composed of a station switching circuit 41, frequency triple increasing circuits 42a to 42e and mixers 43a to 43e, and a beat selector 41. The station switching circuit 41 receives the divided component of the high frequency signal from the voltage dividing circuit 23 to sequentially supply some to the frequency triple increasing circuits 42a to 42e in response to a timing control signal supplied from the detection and control section 50. Each of the frequency triple increasing circuits 42a to 42e increases the frequency of the divided component of the high frequency signal to 3 times its original value and outputs same as a station FM signal to the corresponding one of the mixers 43a to 43e. Each of the mixers 43a to 43e receives the reflection FM signal and the station FM signal to output a beat signal between the reception FM signal and the station FM signal to the beat selector 44. The beat selector 44 outputs one of the beat signals supplied from the mixers 43a to 43e in accordance with a timing control signal supplied from the detection and control section 50.

The detection and control section 50, also herein referred to as the processing section, is composed of a CPU 51, an amplifying circuit 52, an analog to digital (A/D) converting circuit 53, a fast Fourier transform circuit (FFT)54, a timing control circuit 55 and a memory (MEM) 56. The amplifying circuit 52 amplifies the selected beat signal outputted from the beat selector 44 to supply to the A/D converting circuit 53. The A/D converting circuit 53 converts the amplified beat signal into a digital form. The FFT 54 performs fast Fourier transform to the digital beat signal to supply to the CPU 51. The CPU performs a detecting and managing process of a reflector indication data to spectrum from the fast Fourier transform result based on a software which is stored in the memory 56. The CPU 51 stores the reflection indication data in the memory 56, and includes a clock 51-1.

More specifically, the FM signal generating section 20 generates an FM signal having a predetermined voltage level and a center frequency of approximately 20 GHz in the submillimeter wave band and changing linearly in a predetermined period therefrom. The FM signal is approximately equally divided by the voltage dividing circuit 23. One of the divided signal components is supplied to the transmission section 30 and the other is supplied to the reception section 40. In the transmission section 30, the FM signal supplied from the FM signal generating section 20 is distributed into the frequency triple increasing circuits 32a to 32e by the transmission switching circuit 31. Thus, the frequency of the FM signal is increased to 3 times its original value by the corresponding one of the frequency triple increasing circuits 32a to 32e, so that it is converted into the millimeter wave band FM signal in the 60 GHz band. The converted FM signals are supplied to the transmission antennas 11a to 11e in order to be radiated from the respective transmission antennas toward a space in front of the vehicle.

Some of the FM signals which have been radiated from the front of the vehicle through the transmission antennas 11a to 11e may be reflected by the reflector such as a preceding vehicle, and then are received by the corresponding one of the reception antennas 12a to 12e. Thus, reflection FM signals are generated. The reflection FM signal is supplied to a corresponding one of the mixers 43a to 43e at one of the input terminals thereof. The other input terminal of each of the mixers 43a to 43e is supplied with one of the station FM signals supplied from the FM signal generating section 20. The station FM signal is selected by the station switching circuit 41 at a predetermined timing. The frequency of the selected station FM signal is increased to 3 times its original value by a corresponding one of the frequency triple increasing circuits 42a to 42e, to generate a millimeter wave band station FM signal.

Beat signals of the reflection FM signal and the station FM signal are outputted from the mixers 43a to 43e. The beat signals are selected in order by the beat selector 44 for the respective transmission and reception channel and are supplied to the amplifying circuit 52 of the detection and control unit 50. The beat signal is amplified by the amplifying circuit 52 and converted into a digital signal by the analog to digital converting circuit 53, and then is supplied to the fast Fourier transform circuit 54. The beat signal is converted into a frequency spectrum of the beat signal and is supplied to the CPU 51. The CPU 51 detects from the frequency spectrum, reflector indication data indicating a reflector attribute such as the center position and width of the reflector and the azimuth angle to the reflector. Also, the CPU 51 detects the distance to the reflector based on the timing when the beam is radiated and the timing when the reflection wave is received. Further, the CPU 51 controls the timing control circuit 55 to generate various timing control signals, based on which the operations of respective sections in this FM radar apparatus are controlled.

Figure 2:
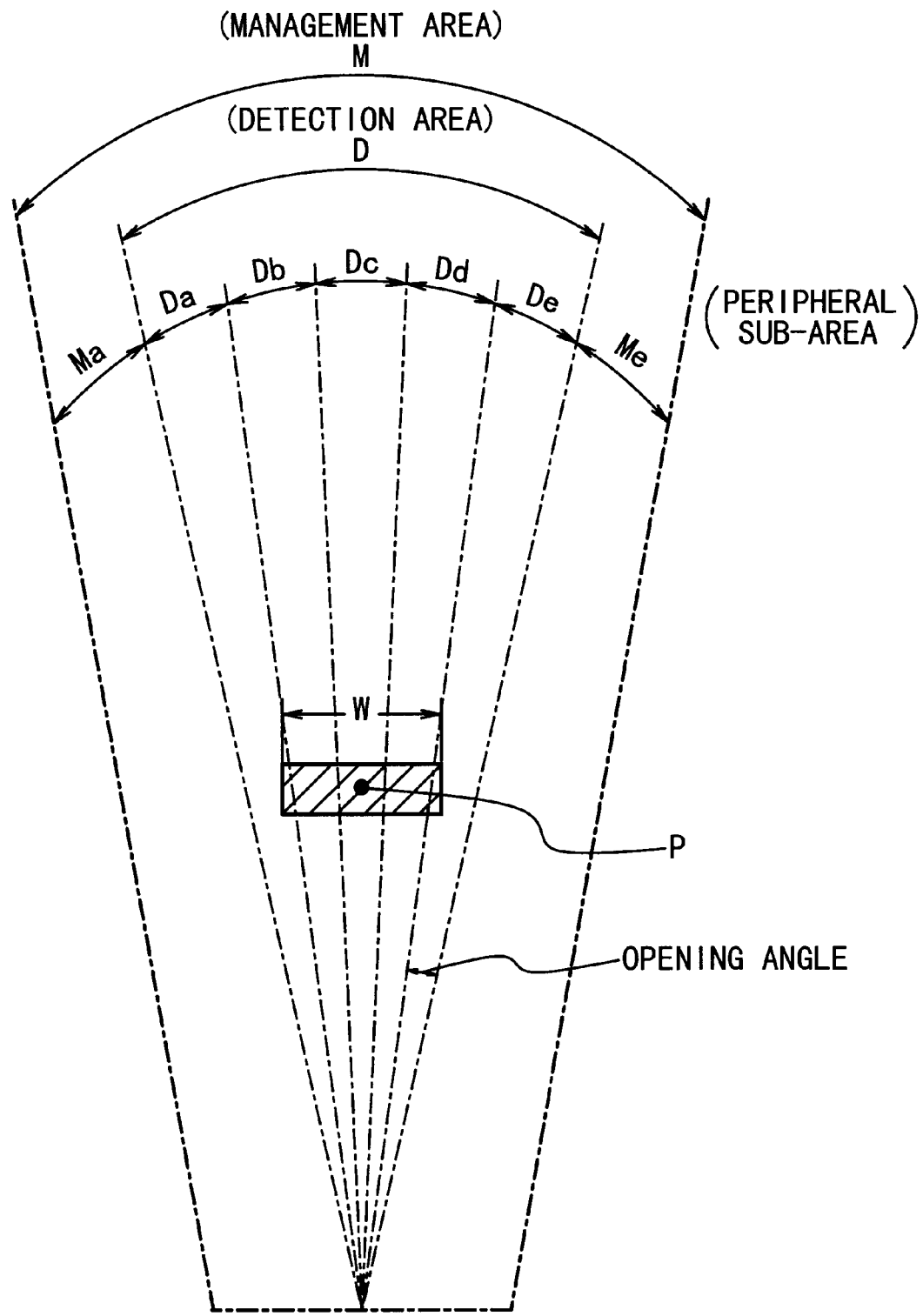
FIG. 2 is a conceptual diagram to explain the relation between a detection area and a management area in the radar apparatus installed on a vehicle according to the preferred embodiment of the present invention.

FIG. 2 is a conceptual diagram to explain the structure of a management area M. The management area M is composed of a detection area D and peripheral areas Ma and Me. The detection area is formed as the area of a fan shape which spreads radially in the front of the vehicle on which this radar apparatus is installed. The detection area D of this fan shape is composed of five sub-areas Da, Db, Dc, Dd and De of a thin fan shape which have substantially the identical shape to each other. The five sub-areas Da, Db, Dc, Dd and De correspond to the transmission and reception channels A to E, respectively. The FM signal beams are radiated to the five sub-areas Da to De from the respective transmission antennas 11a to 11e shown in FIG. 1, respectively. The FM signal beam has a width approximately equal to, or slightly wider that of the corresponding sub-area. Also, the reflection wave is generated in the corresponding sub-area and is received by the corresponding one of the reception antennas 12a to 12e.

The peripheral areas Ma and Me are formed on the both sides of the detection area D and have substantially the same width as that of the preceding vehicle.

The management area M is an area used to manage the movement of the reflector such as the preceding vehicle which has been detected in the detection area D.

It is supposed that the reception levels of the reflection FM signals have been detected to be higher than a predetermined threshold value in three continuous sub-areas Db, Dc and Dd. Also, it is supposed that the distances R from the subject vehicle on which the radar apparatus is installed to the reflector are approximately equal to each other. Here, the fact that the distances to the reflector detected in the respective sub-areas are approximately equal to each other means that a difference between the distances is smaller than a threshold value which has been previously set as the length of a typical vehicle. In this case, the CPU 51 determines that a single reflector exists over the sub-areas Db, Dc and Dd, and detects the center position P of the reflector and the width W of the reflector. In this embodiment, the center position P and the width are detected as the reflector attribute in units of sub-areas. Therefore, the center position P is determined to be the center sub-area Dc. Also, the width of the reflector is determined to be three sub-areas. The reflector indication data such as the center position P and the width W is stored and held in the memory 56. Thus, the movement of the reflector can be managed. In this case, the end portion positions may be detected and stored in the memory 56, in addition to the center position P and the width W.

The center position P of this reflector is expressed as a combination (R, Q) of distance R from the subject vehicle and the center position Q of the sub-area. In an example shown in FIG. 2, the center position Q of the sub-area and the width W are expressed by the following equations (1) and (2).

$$Q = Dcc \quad (1)$$

$$W = R \sin(\theta b + \theta c + \theta d) \quad (2)$$

where Dcc is the center position of the of sub-area Dc (more precisely, an azimuth angle of the center), and $\theta b$, $\theta c$, $\theta d$ are the opening angles of the sub-areas Db, Dc and Dd, respectively.

As an example, it is supposed that the opening angle of each sub-area is 0.1 degrees and the distance R from the subject vehicle is 50 meters. In this case, the width W of the reflector which has been detected from the three sub-areas is 2.6 meters. This value is the same as the width of about 2 meters of a typical motorcar. In this case, the reflector is determined to be a single vehicle. Also, when the detected width W of the reflector is larger than a predetermined threshold value, this reflector is determined to be two or more vehicles or a road or a construction. The predetermined threshold value is previously set to a value indicative of the width of a road or the width of a lane.

Generally, the size of the transmission and reception antennas is set to a sufficiently small value, compared with the width of the vehicle. Therefore, each sub-area corresponding to the beam of the FM signal radiated from each transmission antenna represents a thin fan shape spreading radially from a point where the transmission and reception antenna are arranged, as shown in FIG. 2. In this case, considering that the opening angle of each sub-area is as small as 1 degree, the boundaries between sub-areas are possible to be approximated as a group of parallel lines.

Figure 3:
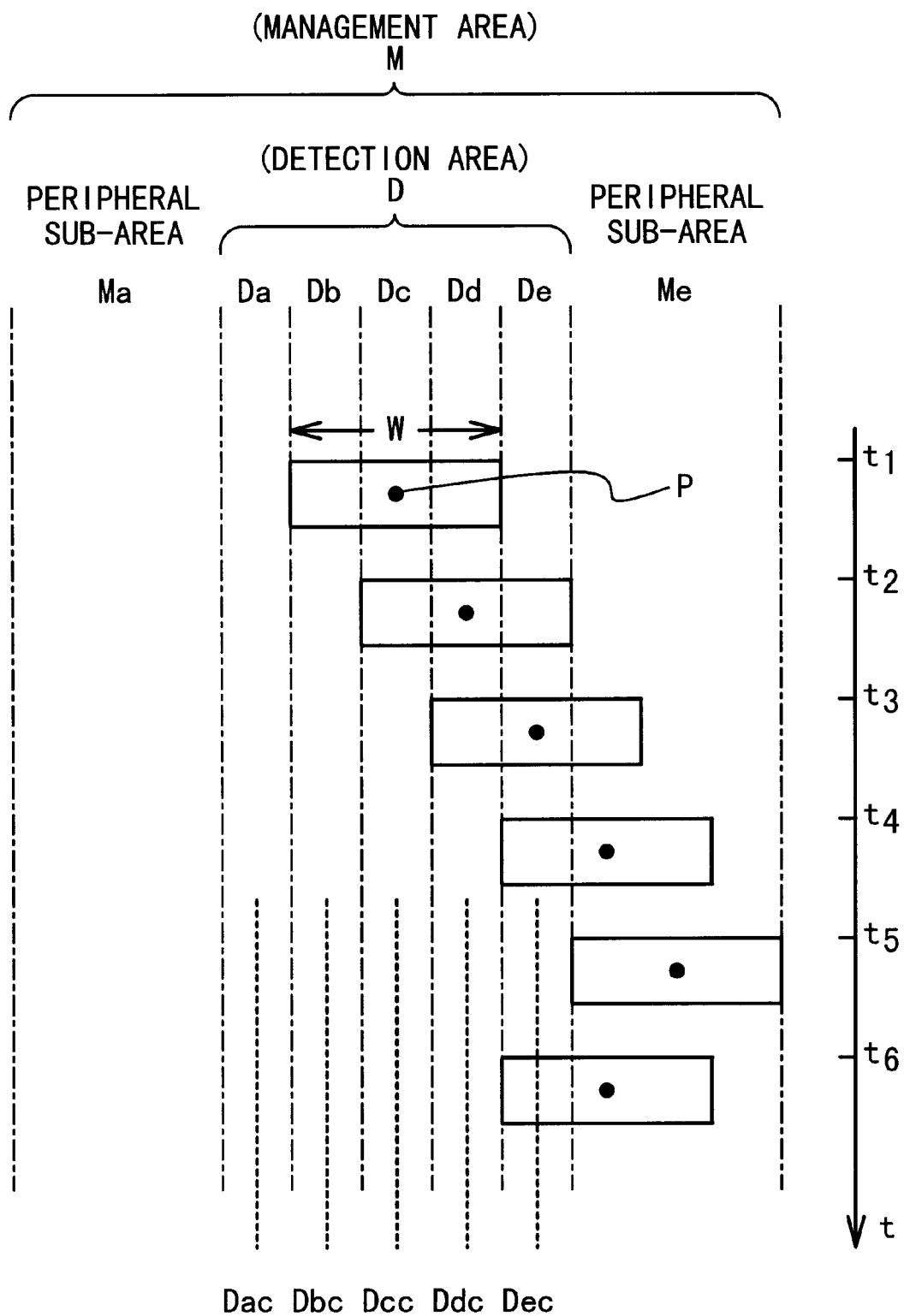
FIG. 3 is a conceptual diagram to explain a method of detecting and managing the center position and width of a reflector by the radar apparatus installed on a vehicle in the above embodiment.

FIG. 3 is a diagram to explain a reflector detecting and managing method according to a preferred embodiment of the invention in a case where the detected sub-areas of the reflector are managed based on the center position P and the width W change with time. The time axis is set to the downward direction in the figure. In this example, the peripheral area is composed of three sub-areas. In this figure, the state that the reflector moves to the right while the distance R from the subject vehicle is kept constant is illustrated. That is, as the time increases from t1 to t2 to t3, the center position P changes from the center position Dcc of the sub-area Dc to the center position Ddc to the center position Dec. In this case, at the time t1, the CPU 51 sets "1" to bits of the memory 56 corresponding to the sub-areas Db, Dc and Dd. Also, at the time t2, the CPU 51 sets "1" to a bit of the memory 56 corresponding to the sub-area De and resets the bit corresponding to the sub-area Db to "0". At the time t3, the CPU 51 sets "1" to a bit of the memory 56 corresponding to the left sub-area of the peripheral area Me and resets the bit corresponding to the sub-area Dc to "0".

At time t4, the center position P goes out of the detection area D and at time t5, the whole reflector goes out of the detection area D. At this time, the CPU 51 sets "1" to a bit of the memory 56 corresponding to the center sub-area of the peripheral area Me and resets the bit corresponding to the sub-area Dd to "0".

In the example of FIG. 3, as shown at times t3 and t4, even if a part of the reflector goes out of the detection area D, the management of the reflector is continued based on the center position P and the width W, as far as the remaining part of the reflector exists in the detection area D.

Also, as shown at time t5, after the whole of the reflector goes out the detection area D, this reflector is regarded to exist in the peripheral area Me, and is managed for a predetermined time. At this time, the CPU 51 sets "1" to a bit of the memory 56 corresponding to the right sub-area of the peripheral area Me and resets the bit corresponding to the sub-area De to "0".

When a part of a reflector comes again into the detection area D at time t6 which is within the predetermined time, a part of the reflector is detected so that it is determined that the previously detected reflector has come back. On the other hand, when a part of a reflector comes again into the detection area D at time t6 after the predetermined time, a part of the reflector is detected so t hat it is determined that a new reflector has been detected. At this time, the CPU 51 sets "1" to a bit of the memory 56 corresponding to the sub-area De of the detection area D and resets the bit corresponding to the right sub-area of the peripheral area Me to "0".

Thereafter, the movement of the reflector is managed.

The widths of the peripheral areas Ma and Me which are provided for both sides of the detection area D may be previously set to a value of the width of a road lane or the width of the vehicle. Or, the widths of the peripheral areas Ma and Me may be dynamically set to the value which is equal to the width of the reflector which has been detected in the detection area D.

Figure 4:
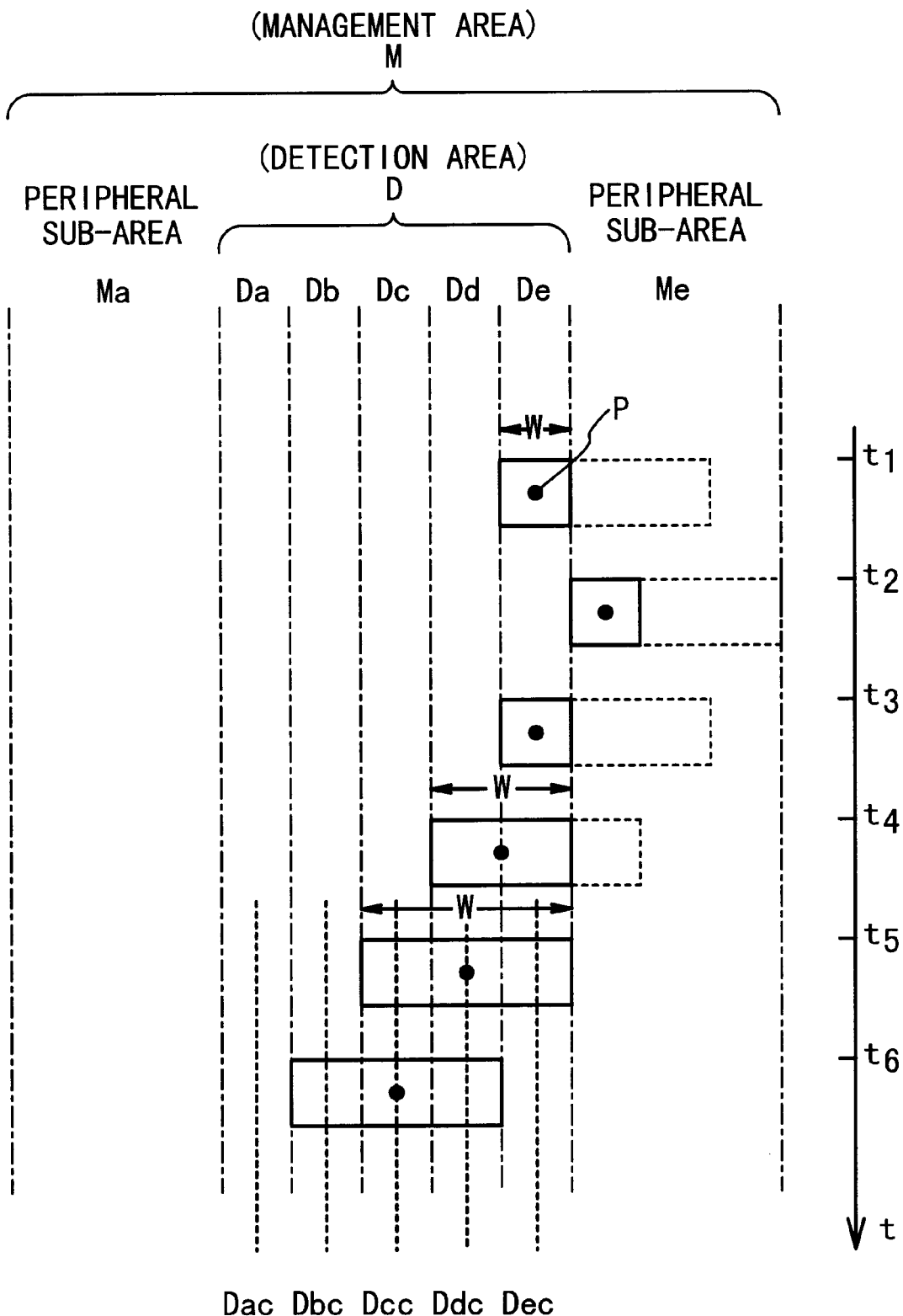
FIG. 4 is another conceptual diagram to explain the method of detecting and managing the center position and width of the reflector by the radar apparatus installed on the vehicle in the above embodiment.

FIG. 4 is a diagram to explain another reflector detecting and managing method according to a preferred embodiment of the invention in the case where the movement of the reflector is made in a reverse direction to that of FIG. 3. That is, at first, a part of the reflector is detected only in the sub-area De at time t1. In this case, the center position P is detected and managed to be equal to the center position Dec of this sub-area De. Also, the width W is detected and managed to be equal to the width of this sub-area De. Subsequently, at time t2, even if the reflector goes out of the detection area D once during this management, the reflector is regarded to exist in the peripheral area and is managed for the predetermined time period. When returning to the detection area D at the time t3 before the above predetermined time elapses, the reflector is determined to be the reflector having the width already detected. In this case, only the center position is updated to the lateral direction.

Next, at time t4, when the center position P of the reflector moves into the direction of the center of the detection area D, the width W increases from the width of the sub-area De to the width of the summation of sub-areas De and Dd. In this case, the center position P and the width W are updated to a new center position and a new width.

Thereafter, at time t5, the center position of the reflector further moves to the direction of the center of the detection area D, so that the width W increases to the summation of the three continuous sub-areas De, Dd and Dc. In this case, the width is updated to a new increased width together with the center position to the lateral direction. Subsequently, at time t6, even if the center position of the reflector moves further to the left direction, the width W does not increase. In this case, only the center position of the reflector to the lateral direction is updated by a new value. In this way, the width of the reflector already detected is updated to a new value only when the width of the reflector is increased more than the managed value. In this method, the description of the bit setting operation by the CPU 51 is omitted. However, the operation is performed similarly to that shown and described in relation to FIG. 3.

In the above description, the detection operation is performed based on whether the reflection wave having a reception level higher than the predetermined threshold value is detected in units of sub-areas of the detection area D. In this example, the center position of the reflector and the width of the reflector are detected and managed as numerical values.

When the center position of the reflector to the lateral direction is determined, a weighting and averaging operation in azimuth angle may be used based on the reception level of the reflection wave. That is, the weighting and averaging operation in azimuth angle of the centerline of each fan-shaped sub-area can be used.

It is supposed that the azimuth angles of the centerlines of respective fan-shaped sub-areas are $\theta a$, $\theta b$, $\theta c$, $\theta d$, and $\theta e$, and the reception levels of the reflection waves which are received in the respective sub-areas are La, Lb, Lc, Ld, and Le. In this case, the center position $\Theta$ of the reflector to the lateral direction is calculated as the result of the following weighting and averaging operation.

$$\Theta = (La\ \theta a + Lb\theta b + Lc\theta c + Ld\theta d + Le\ \theta e)/(La + Lb + Lc + Ld + Le) \quad (3)$$

Figure 5:
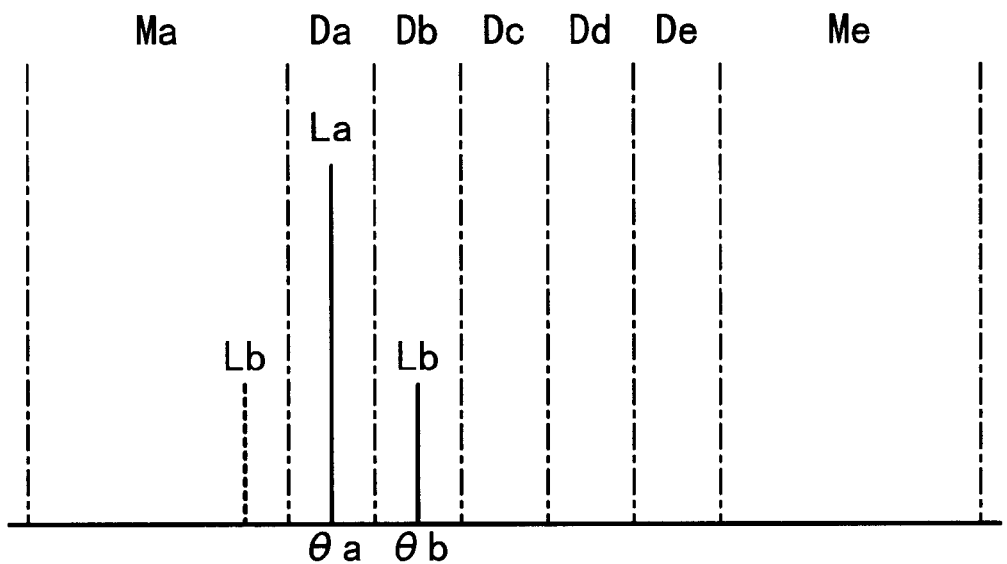
FIG. 5 is a conceptual diagram to explain the method of detecting and managing the center position and width of the reflector by the radar apparatus installed on the vehicle in the above embodiment.

FIG. 5 shows a case where the reception levels Lb and La of the reflection waves increase monotonously from the sub-area Db of the detection area D to the direction of the sub-area Da thereof. In this case, when the center position $\Theta$ of the reflector to the lateral direction is calculated using the above-mentioned weighting and averaging operation, the center position is calculated to be an intermediate value between the azimuth angles of $\theta a$ and $\theta b$. However, it is expected that the actual center position of the reflector exists in the sub-area Da or the peripheral area Ma. Therefore, in the preferred embodiment of the present invention, an imaginary reception level Lb' of the reflection wave is supplemented at a symmetrical position of the azimuth angle having the reception level Lb with respect to the azimuth angle having the maximum level La, as shown by the dotted line outside the detection area D. As a result, a center position $\Theta$ of the reflector (or azimuth angle $\theta a$) is determined to be in the center Dac of the sub-area Da. Then, the width W of the reflector is detected over three sub-areas where the reception levels are higher than the predetermined threshold value, including the imaginary reception level are present. These values are managed for the entire management area M, which including the peripheral area Ma.

Figure 6:
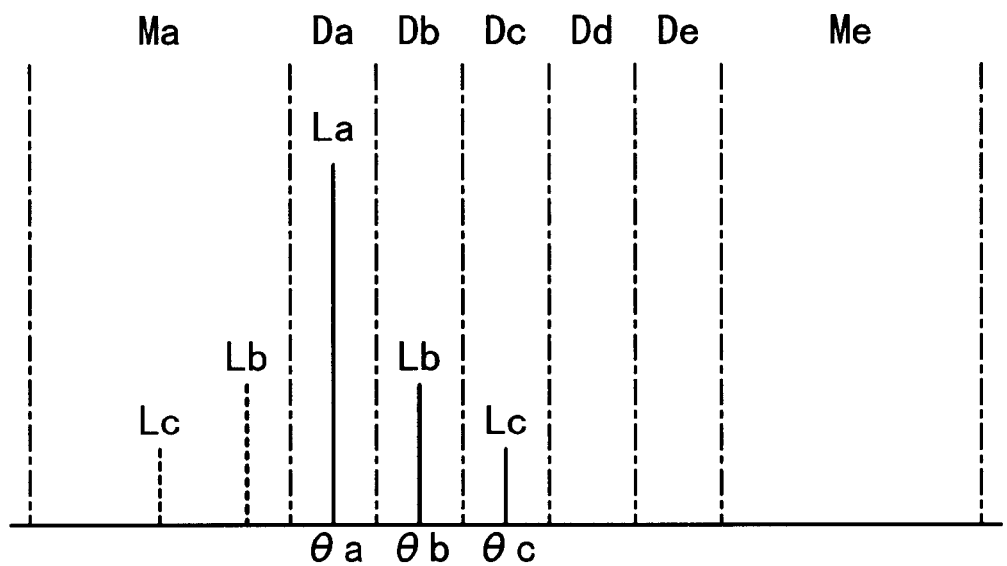
FIG. 6 is a conceptual diagram to explain the method of detecting and managing the center position and width of the reflector by the radar apparatus installed on the vehicle in the above embodiment.

It is supposed that after the state illustrated in FIG. 5, the reception levels of the reflection waves change with movement of the reflector into the state shown in FIG. 6. That is, the reception levels increase monotonously in order of Lc, Lb, and La in the direction of the peripheral area, as illustrated in FIG. 6. In this case, two imaginary reception levels Lb and Lc of the reflection waves are supplemented at the symmetrical positions with respect to the maximum reception level La of the reflection wave, as shown by the dotted lines outside the detection area D. As a result, the center position $\Theta$ of the reflector does not change. However, the width over five sub-areas is detected, and the width is updated based on this new value.

As described above, the determination of whether the reception levels of the reflection waves increase monotonously in the direction of the peripheral area is performed by comparing the reception levels over all the sub-areas where the reflection waves are detected. However, the determination may otherwise be performed, for example, by comparing the reception levels of some of the sub-areas having higher ones of the reception levels which are detected to be higher than the predetermined threshold value. Also, the comparing operation may be performed by a simple comparing operation or by the weighting and comparing operation in which suitable coefficients are multiplied with the reception levels.

In the above description, the center position and width of the reflector are detected and managed. However, it is possible to detect and manage only one of the center position and width of the reflector.

Also, the example is described above in which the transmission antenna and the reception antenna are formed as a defocus parabolic multi-beam antenna, which is composed of a common parabolic reflecting mirror and a plane array antenna as a primary emitter arranged in the neighborhood of the focus of this reflecting mirror. However, the radar apparatus may be formed to have other structures, such as a structure in which a beam is radiated over the whole detection area from a single transmission antenna to have a substantially uniform level, and the reflection waves may be received by a plurality of reception antennas having a narrow directivity to cover the corresponding sub-area. On the contrary, the radar apparatus may be formed to have a structure in which a beam is radiated from the transmission antenna having the narrow directivity to each sub-area, and the reflection waves are received by a single transmission antenna having a wide directivity.

Moreover, the example of the FM radar apparatus which radiates a frequency modulated wave is described. However, other various systems can be applied such as an AM radar apparatus which radiates an amplitude modulated wave and receives the reflection wave, a pulse radar apparatus which radiates a pulse electromagnetic wave and receives the reflection wave, and which detects a distance to the reflector from the time difference from the radiation to the reception, instead of such a frequency modulated wave.

Moreover, the example is described, in which a millimeter wave band electromagnetic wave is radiated and the reflection wave is received. However, in the radar apparatus it is possible to have a structure in which the electromagnetic wave having another frequency such as a microwave band or a laser beam and another suitable wave such as supersonic wave are radiated and the reflection wave is received so that the distance to the reflector and an azimuth angle are detected.

As described above in detail, the radar apparatus installed on a vehicle of the present invention is advantageous because the position or width of the reflector is managed based on the reception information of the reflection wave from the reflector, and the detection of the object is possible in the area which is wider than the actual detection area.

When the radar apparatus installed on a vehicle of the present invention is used as the radar apparatus for tracking a preceding vehicle, there is an advantage in that loss of the preceding vehicle in a steep corner is made minimum, and stable tracking drive becomes possible. Although there have been described what are considered at present to be the preferred embodiments of the invention, it will be understood by persons skilled in the art that variations and modifications may be made thereto without departing from the spirit or essence of the invention. The scope of the invention is indicated by the appended claims, rather than by the foregoing description.

What is claimed is:

1. A radar apparatus installed on a vehicle comprising:
    a transmission section having at least a transmission antenna, for emitting a transmission wave toward a detection area in front of said vehicle, wherein the transmission wave may be reflected by a reflector to produce a reflection wave, and said detection area includes a plurality of sub-areas;
    a reception section having at least a reception antenna, for receiving and detecting said reflection wave; and
    a processing section for detecting a reflector indication data indicative of a reflector attribute based on a detecting result by said reception section, for determining whether there is said reflector in said detection area, based on the reflector indication data, and for managing said reflector indication data over a management area which is wider than said detection area.

2. A radar apparatus according to claim 1, wherein said processing section determines that there is said reflector in said detection area when a reception level of said reflection wave in at least one of said plurality of sub-areas is higher than a predetermined threshold value.

3. A radar apparatus according to claim 2, wherein said processing section detects a width of said reflector as said reflector attribute in units of said sub-areas.

4. A radar apparatus according to claim 3, wherein said processing section detects a width of said reflector as said reflector attribute based on a predetermined width value set for each of said plurality of sub-areas and a number of continuous ones of said plurality of sub-areas, in each of which the reception level of said reflection wave is higher than said predetermined threshold value.

5. A radar apparatus according to claim 2, wherein said processing section further determines a distance to said reflector based on a time of the emission of said transmission wave and a time of the reception of said reflection wave, and
    wherein each of said plurality of sub-areas has a fan shape with an opening angle, and
    wherein said processing section calculates a sub-area width value based on said opening angle and the distance to said reflector, and determines said width of said reflector based on the calculated sub-area width value and a number of continuous ones of said plurality of sub-areas, in each of which the reception level of said reflection wave is higher than said predetermined threshold value.

6. A radar apparatus according to claim 2, wherein said processing section detects a center position of said reflector as said reflector attribute based on continuous ones of said plurality of sub-areas, in each of which the reception level of said reflection wave is higher than said predetermined threshold value.

7. A radar apparatus according to claim 2, wherein said processing section detects a center position of said reflector as said reflector attribute based on said reflection wave reception levels higher than said predetermined threshold value in continuous ones of said plurality of sub-areas and an azimuth angle in each of said continuous sub-areas.

8. A radar apparatus according to claim 7, wherein when said reflection wave reception levels higher than said predetermined threshold value increase monotonously in said continuous sub-areas, said processing section supplements in said management area, at least an imaginary reflection wave reception level corresponding to said reflection wave reception levels, and said processing section detects a center position of said reflector as said reflector attribute based on said reflection wave reception levels higher than said predetermined threshold value, including said imaginary reflection wave reception level, and an azimuth angle in each of said continuous sub-areas.

9. A radar apparatus according to claim 2, wherein said processing section detects a center position of said reflector as said reflector attribute based on a higher portion of said reflection wave reception levels higher than said predetermined threshold value in continuous ones of said plurality of sub-areas and an azimuth angle in each one of said continuous sub-areas corresponding to the higher portion.

10. A radar apparatus according to claim 1, wherein said processing section continues the management of said reflector indication data when it is determined that said reflector is not in said detection area and when it is determined that said reflector is in a peripheral area of said management area outside said detection area.

11. A radar apparatus according to claim 10, wherein said processing section continues the management of said reflector indication data when it is determined that said reflector is not in said detection area and when it is again later determined within a predetermined time that said reflector is in said detection area.

12. A radar apparatus according to claim 1, wherein said processing section stops the management of said reflector indication data when it is determined that said reflector is not in said detection area and when a predetermined time elapses thereafter.

13. A radar apparatus according to claim 1, wherein said management area includes said detection area and peripheral areas provided on both sides of said detection areas, and
    wherein a width of each of said peripheral areas is predetermined.

14. A radar apparatus according to claim 1, wherein said management area includes said detection area and peripheral areas provided on both sides of said detection areas, and
    wherein a width of said peripheral areas is automatically set based on a width of said reflector.

15. A method of managing a reflector indication data in a radar apparatus installed on a vehicle comprising the steps of:

emitting a transmission wave toward a detection area in front of said vehicle, wherein the transmission wave may be reflected by a reflector to produce a reflection wave, and said detection area includes a plurality of sub-areas;

receiving and detecting said reflection wave;

detecting a reflector indication data indicative of a reflector attribute based on the detecting result of said receiving and detecting step;

determining whether there is said reflector in said detection area, based on the reflector indication data; and managing said reflector indication data over a management area which is wider than said detection area.

16. A method according to claim 15, wherein said detecting step includes detecting that there is the reflector in the detection area based on a reception level of the reflection wave in at least one of said plurality of sub-areas which is higher than a predetermined threshold value.

17. A method according to claim 16, wherein said detecting step includes detecting said reflector in units of sub-areas.

18. A method according to claim 15, wherein said managing step involves continuing the management of said reflector indication data when it is determined that said reflector is not in said detection area and when it is determined that said reflector is in a peripheral area of said management area outside said detection area.

19. A method according to claim 18, wherein said managing step involves continuing the management of said reflector indication data when it is determined that said reflector is not in said detection area and when it is later determined within a predetermined time that said reflector is in said detection area.

20. A method according to claim 15, further comprising the step of stopping the management of said reflector indication data when it is determined that said reflector is not in said detection area and when a predetermined time elapses thereafter.

21. A method according to claim 15, wherein said management area includes said detection area and peripheral areas provided on both sides of said detection area, and wherein a width of each of said peripheral areas is predetermined.

22. A method according to claim 15, wherein said management area includes said detection area and peripheral areas provided on both sides of said detection areas, and wherein a width of said peripheral areas is automatically set based on a width of said reflector.

* * * * *

UNITED STATES PATENT AND TRADEMARK OFFICE
CERTIFICATE OF CORRECTION

PATENT NO : 6,008,751
DATED : 28 December 1999
INVENTOR(S): Hiroshi Kudoh

It is certified that error appears in the above-identified patent and that said Letters Patent is hereby corrected as shown below:

Column 1, line 6, after "Invention" begin a new paragraph with "The present";
line 8, after "apparatus" delete the comma;
line numbered between 33 and 34, change "may be are" to --may be--.
Column 2, line numbered between 19 and 20, before "reflection" insert --a--.
Column 3, line numbered between 44 and 45, before "reflection" insert --a--.
Column 4, line 61, delete "are".
Column 5, line 34, change "beat selector 41" to --beat selector 44--;
line 37, change "some" to --same--.
Column 7, line 1, after "wider" insert --than--;
line 45, change "of the of" to --of the--.
Column 8, line 36, after "out" insert --of--;
line 48, change "t hat" to --that--.
Column 10, line 11, delete "which".
Column 11, line 6, before "supersonic" insert --a--;
line numbered between 19 and 20, begin a new paragraph with "Although".
Column 14, line 6 (Claim 19, 4th line), before "later" insert --again--.

Signed and Sealed this

Fourteenth Day of November, 2000

*Attest:*

Q. TODD DICKINSON

*Attesting Officer*     *Director of Patents and Trademarks*